US008780770B2

(12) United States Patent
Wang et al.

(10) Patent No.: US 8,780,770 B2
(45) Date of Patent: Jul. 15, 2014

(54) SYSTEMS AND METHODS FOR VOICE AND VIDEO COMMUNICATION OVER A WIRELESS NETWORK

(75) Inventors: Weilin Wang, San Diego, CA (US);
Weiguang Shi, San Diego, CA (US);
Victor Rollinger, San Diego, CA (US);
Yun Wu, San Diego, CA (US); Michael Nova, Del Mar Mesa, CA (US)

(73) Assignee: Misonimo Chi Acquisition L.L.C., Dover, DE (US)

( * ) Notice: Subject to any disclaimer, the term of this patent is extended or adjusted under 35 U.S.C. 154(b) by 1000 days.

(21) Appl. No.: 11/741,637

(22) Filed: Apr. 27, 2007

(65) Prior Publication Data
US 2008/0031169 A1 Feb. 7, 2008

Related U.S. Application Data

(63) Continuation-in-part of application No. 11/462,663, filed on Aug. 4, 2006, now Pat. No. 7,957,356, which is a continuation of application No. 11/420,668, filed on May 26, 2006, now Pat. No. 7,852,796, which is a continuation-in-part of application No. 10/816,481, filed on Apr. 1, 2004, now abandoned, which is a continuation-in-part of application No. 10/437,128, filed on May 13, 2003, now Pat. No. 7,069,483, and a continuation-in-part of application No. 11/420,668, which is a continuation-in-part of application No. 11/076,738, filed on Mar. 9, 2005, now abandoned, which is a continuation-in-part of application No. 10/437,129, filed on May 13, 2003, now abandoned, application No. 11/741,637, which is a continuation-in-part of application No. 11/615,582, filed on Dec. 22, 2006, now Pat. No. 7,941,149.

(60) Provisional application No. 60/380,425, filed on May 13, 2002, provisional application No. 60/747,409, filed on May 16, 2006.

(51) Int. Cl.
*H04B 7/00* (2006.01)

(52) U.S. Cl.
USPC ........... 370/310; 370/315; 370/352; 370/338; 455/557; 455/426.1

(58) Field of Classification Search
USPC ............... 370/310, 315, 352, 338; 379/88.12; 455/558, 557, 426.1
See application file for complete search history.

(56) References Cited

U.S. PATENT DOCUMENTS 4,706,689 A 11/1987 Man
5,309,437 A 5/1994 Perlman et al.
(Continued)

FOREIGN PATENT DOCUMENTS

WO 2004104722 12/2004
WO 2004104850 12/2004
(Continued)

OTHER PUBLICATIONS

JP 2004304720 machine translation.*
(Continued)

*Primary Examiner* — Jinsong Hu
*Assistant Examiner* — Jean Chang

(57) ABSTRACT

Systems and methods for communicating voice and video over a wireless network. A signal, formatted as Internet protocol (VoIP, IPTV, etc.) data, is received from a device. The signal is adapted for a wireless network and then transmitted to the wireless network. Signals are also received from the wireless network and adapted to a IP formatted signal and transmitted to the device. The signals transmitted between the device and the wireless network include voice traffic as well as multimedia and other high bandwidth signals.

9 Claims, 12 Drawing Sheets

(56) References Cited

U.S. PATENT DOCUMENTS

| | | |
|---|---|---|
| 5,699,355 A | 12/1997 | Natarajan |
| 5,844,905 A | 12/1998 | McKay et al. |
| 5,940,771 A | 8/1999 | Gollnick et al. |
| 5,943,322 A | 8/1999 | Mayor et al. |
| 5,959,999 A | 9/1999 | An |
| 6,003,007 A | 12/1999 | DiRienzo |
| 6,023,563 A | 2/2000 | Shani |
| 6,076,066 A | 6/2000 | DiRienzo |
| 6,122,516 A | 9/2000 | Thompson et al. |
| 6,161,104 A | 12/2000 | Stakutis et al. |
| 6,173,387 B1 | 1/2001 | Baxter et al. |
| 6,199,115 B1 | 3/2001 | DiRienzo |
| 6,208,629 B1 | 3/2001 | Jaszewski et al. |
| 6,226,642 B1 | 5/2001 | Beranek et al. |
| 6,226,684 B1 | 5/2001 | Sung et al. |
| 6,236,662 B1 | 5/2001 | Reilly |
| 6,272,492 B1 | 8/2001 | Kay |
| 6,282,513 B1 | 8/2001 | Strawder |
| 6,289,316 B1 | 9/2001 | Aghili et al. |
| 6,292,596 B1 | 9/2001 | Snyder et al. |
| 6,330,244 B1 | 12/2001 | Swartz et al. |
| 6,331,762 B1 | 12/2001 | Bertness |
| 6,336,114 B1 | 1/2002 | Garrison |
| 6,338,093 B1 | 1/2002 | DiRienzo |
| 6,343,310 B1 | 1/2002 | DiRienzo |
| 6,345,260 B1 | 2/2002 | Cummings, Jr. et al. |
| 6,349,334 B1 | 2/2002 | Faupel et al. |
| 6,356,992 B1 | 3/2002 | Baxter et al. |
| 6,357,010 B1 | 3/2002 | Viets et al. |
| 6,366,683 B1 | 4/2002 | Langlotz |
| 6,366,912 B1 | 4/2002 | Wallent et al. |
| 6,366,929 B1 | 4/2002 | Dartigues et al. |
| 6,385,730 B2 | 5/2002 | Garrison |
| 6,414,955 B1 | 7/2002 | Clare et al. |
| 6,418,549 B1 | 7/2002 | Ramchandran et al. |
| 6,434,191 B1 | 8/2002 | Agrawal et al. |
| 6,460,128 B1 | 10/2002 | Baxter et al. |
| 6,480,497 B1 | 11/2002 | Flammer, III et al. |
| 6,526,534 B1 | 2/2003 | Nagoya |
| 6,625,605 B1 | 9/2003 | Terakura et al. |
| 6,628,636 B1 | 9/2003 | Young |
| 6,640,087 B2 | 10/2003 | Reed et al. |
| 6,665,311 B2 | 12/2003 | Kondylis et al. |
| 6,671,840 B1 | 12/2003 | Nagoya et al. |
| 6,687,259 B2 | 2/2004 | Alapuranen |
| 6,694,313 B1 | 2/2004 | Roemer |
| 6,704,321 B1 | 3/2004 | Kamiya |
| 6,754,188 B1 | 6/2004 | Garahi et al. |
| 6,754,499 B1 | 6/2004 | Smith |
| 6,760,877 B1 | 7/2004 | Lappetelainen et al. |
| 6,763,007 B1 | 7/2004 | La Porta et al. |
| 6,763,013 B2 | 7/2004 | Kennedy |
| 6,788,702 B1 | 9/2004 | Garcia-Luna-Aceves et al. |
| 6,791,949 B1 | 9/2004 | Ryu et al. |
| 6,795,418 B2 | 9/2004 | Choi |
| 6,807,165 B2 | 10/2004 | Belcea |
| 6,839,541 B2 | 1/2005 | Alzoubi et al. |
| 6,845,084 B2 | 1/2005 | Rangnekar et al. |
| 6,850,502 B1 | 2/2005 | Kagan et al. |
| 6,850,511 B2 | 2/2005 | Kats et al. |
| 6,853,641 B2 | 2/2005 | Lindhorst-Ko et al. |
| 6,865,371 B2 | 3/2005 | Salonidis et al. |
| 6,868,072 B1 | 3/2005 | Lin et al. |
| 6,870,846 B2 | 3/2005 | Cain |
| 6,879,570 B1 | 4/2005 | Choi |
| 6,894,985 B2 | 5/2005 | Billhartz |
| 6,904,021 B2 | 6/2005 | Belcea |
| 6,907,257 B2 | 6/2005 | Mizutani et al. |
| 6,909,721 B2 | 6/2005 | Ekberg et al. |
| 6,912,215 B1 | 6/2005 | Lin et al. |
| 6,948,048 B2 | 9/2005 | Baxter et al. |
| 6,950,418 B1 | 9/2005 | Young et al. |
| 6,961,310 B2 | 11/2005 | Cain |
| 6,965,575 B2 | 11/2005 | Srikrishna et al. |
| 6,970,714 B2 | 11/2005 | D'Souza et al. |
| 6,975,613 B1 | 12/2005 | Johansson |
| 6,975,614 B2 | 12/2005 | Kennedy |
| 6,980,524 B1 | 12/2005 | Lu et al. |
| 6,980,810 B1 | 12/2005 | Gerakoulis et al. |
| 6,985,476 B1 | 1/2006 | Elliott et al. |
| 6,986,161 B2 | 1/2006 | Billhartz |
| 6,990,092 B1 | 1/2006 | Siala |
| 6,993,358 B2 | 1/2006 | Shiotsu et al. |
| 7,002,944 B2 | 2/2006 | Kats et al. |
| 7,003,313 B2 | 2/2006 | Garces et al. |
| 7,007,102 B2 | 2/2006 | Billhartz et al. |
| 7,016,328 B2 | 3/2006 | Chari et al. |
| 7,027,426 B2 | 4/2006 | Billhartz |
| 7,031,293 B1 | 4/2006 | Srikrishna et al. |
| 7,035,207 B2 | 4/2006 | Winter et al. |
| 7,046,639 B2 | 5/2006 | Garcia-Luna-Aceves et al. |
| 7,046,649 B2 | 5/2006 | Awater et al. |
| 7,047,473 B2 | 5/2006 | Hwang et al. |
| 7,050,806 B2 | 5/2006 | Garces et al. |
| 7,050,819 B2 | 5/2006 | Schwengler et al. |
| 7,053,770 B2 | 5/2006 | Ratiu et al. |
| 7,054,126 B2 | 5/2006 | Strutt et al. |
| 7,058,021 B2 | 6/2006 | Srikrishna et al. |
| 7,061,895 B1 | 6/2006 | Habetha |
| 7,062,286 B2 | 6/2006 | Grivas et al. |
| 7,069,483 B2 | 6/2006 | Gillies |
| 7,075,414 B2 | 7/2006 | Giannini et al. |
| 7,082,111 B2 | 7/2006 | Amouris |
| 7,082,115 B2 | 7/2006 | Bauer et al. |
| 7,089,066 B2 | 8/2006 | Hesse et al. |
| 7,091,852 B2 | 8/2006 | Mason et al. |
| 7,095,732 B1 | 8/2006 | Watson, Jr. |
| 7,116,983 B2 | 10/2006 | Lan et al. |
| 7,120,126 B2 | 10/2006 | Odman et al. |
| 7,133,398 B2 | 11/2006 | Allen et al. |
| 7,139,336 B2 | 11/2006 | Nefedov |
| 7,151,777 B2 | 12/2006 | Sawey |
| 7,164,671 B2 | 1/2007 | Del Prado et al. |
| 7,200,112 B2 | 4/2007 | Sundar et al. |
| 7,233,584 B2 | 6/2007 | Nguyen et al. |
| 7,245,947 B2 | 7/2007 | Salokannel et al. |
| 7,251,224 B2 | 7/2007 | Ades et al. |
| 7,269,198 B1 | 9/2007 | Elliott et al. |
| 7,280,517 B2 | 10/2007 | Benveniste |
| 7,280,555 B2 | 10/2007 | Stanforth et al. |
| 7,301,958 B2 | 11/2007 | Borkowski et al. |
| 7,313,398 B1 | 12/2007 | Ramahi |
| 7,324,824 B2 | 1/2008 | Smith et al. |
| 7,376,099 B2 | 5/2008 | Tseng et al. |
| 7,379,447 B2 | 5/2008 | Dunagan et al. |
| 7,388,849 B2 | 6/2008 | Kim et al. |
| 7,395,073 B2 | 7/2008 | Gwon et al. |
| 7,418,523 B2 | 8/2008 | Pettyjohn et al. |
| 7,428,523 B2 | 9/2008 | Tsang et al. |
| 7,451,365 B2 | 11/2008 | Wang et al. |
| 7,496,059 B2 | 2/2009 | Yoon |
| 7,522,537 B2 | 4/2009 | Joshi |
| 7,609,641 B2 | 10/2009 | Strutt et al. |
| 7,688,808 B2 | 3/2010 | Ren et al. |
| 7,701,858 B2 | 4/2010 | Werb et al. |
| 2003/0126291 A1 | 7/2003 | Wang et al. |
| 2003/0142624 A1 | 7/2003 | Chiussi et al. |
| 2003/0157951 A1 | 8/2003 | Hasty |
| 2003/0161268 A1 | 8/2003 | Larsson et al. |
| 2003/0179742 A1 | 9/2003 | Ogier et al. |
| 2003/0193908 A1 | 10/2003 | Cain |
| 2003/0202524 A1 | 10/2003 | Conner et al. |
| 2003/0212821 A1 | 11/2003 | Gillies |
| 2003/0212941 A1 | 11/2003 | Gillies et al. |
| 2003/0224787 A1 | 12/2003 | Gandolfo |
| 2004/0109428 A1 | 6/2004 | Krishnamurthy |
| 2004/0147223 A1 | 7/2004 | Cho |
| 2004/0152416 A1 | 8/2004 | Dahl |
| 2004/0192713 A1 | 9/2004 | Nisnevich et al. |
| 2004/0198375 A1 | 10/2004 | Schwengler et al. |
| 2004/0204084 A1* | 10/2004 | Tan et al. ...................... 455/557 |
| 2004/0229566 A1 | 11/2004 | Wang et al. |
| 2005/0002366 A1 | 1/2005 | Toskala et al. |
| 2005/0022175 A1 | 1/2005 | Sliger et al. |

(56) References Cited

U.S. PATENT DOCUMENTS

| | | | |
|---|---|---|---|
| 2005/0026621 A1 | 2/2005 | Febvre et al. | |
| 2005/0083971 A1 | 4/2005 | Delaney et al. | |
| 2005/0090266 A1 | 4/2005 | Sheynblat | |
| 2005/0111475 A1 | 5/2005 | Borkowski et al. | |
| 2005/0141453 A1 | 6/2005 | Zhu | |
| 2005/0190770 A1 | 9/2005 | Saniee et al. | |
| 2005/0201315 A1 | 9/2005 | Lakkis | |
| 2005/0201340 A1 | 9/2005 | Wang et al. | |
| 2005/0201346 A1 | 9/2005 | Wang et al. | |
| 2005/0221752 A1 | 10/2005 | Jamieson et al. | |
| 2005/0232179 A1* | 10/2005 | daCosta et al. | 370/315 |
| 2005/0265324 A1* | 12/2005 | Wen et al. | 370/356 |
| 2006/0104205 A1 | 5/2006 | Strutt et al. | |
| 2006/0104292 A1 | 5/2006 | Gupta et al. | |
| 2006/0128376 A1* | 6/2006 | Alexis | 455/426.1 |
| 2006/0128402 A1 | 6/2006 | Lee et al. | |
| 2006/0182142 A1 | 8/2006 | Schmidt | |
| 2006/0198339 A1 | 9/2006 | Marinier et al. | |
| 2006/0215583 A1 | 9/2006 | Castagnoli | |
| 2006/0215593 A1 | 9/2006 | Wang | |
| 2006/0240843 A1 | 10/2006 | Spain et al. | |
| 2006/0253747 A1 | 11/2006 | Gillies | |
| 2006/0268908 A1 | 11/2006 | Wang | |
| 2007/0049329 A1* | 3/2007 | Mayer et al. | 455/552.1 |
| 2007/0049342 A1* | 3/2007 | Mayer et al. | 455/558 |
| 2007/0076673 A1 | 4/2007 | Joshi | |
| 2007/0076697 A1* | 4/2007 | Huotari et al. | 370/352 |
| 2007/0104215 A1 | 5/2007 | Wang | |
| 2007/0110102 A1 | 5/2007 | Yagyuu et al. | |
| 2007/0159991 A1 | 7/2007 | Noonan et al. | |
| 2007/0201421 A1 | 8/2007 | Huseth | |
| 2007/0211682 A1* | 9/2007 | Kim et al. | 370/338 |
| 2007/0230447 A1* | 10/2007 | Hahn et al. | 370/352 |
| 2007/0247367 A1 | 10/2007 | Anjum et al. | |
| 2007/0247368 A1 | 10/2007 | Wu | |
| 2007/0258508 A1 | 11/2007 | Werb et al. | |
| 2007/0294226 A1 | 12/2007 | Chahal et al. | |
| 2008/0032705 A1 | 2/2008 | Patel | |
| 2008/0037723 A1* | 2/2008 | Milstein et al. | 379/88.12 |
| 2008/0069071 A1 | 3/2008 | Tang | |
| 2008/0080378 A1 | 4/2008 | Kim et al. | |
| 2008/0192713 A1* | 8/2008 | Mighani et al. | 370/338 |
| 2008/0259895 A1 | 10/2008 | Habetha et al. | |
| 2009/0073924 A1 | 3/2009 | Chou | |

FOREIGN PATENT DOCUMENTS

| | | |
|---|---|---|
| WO | 2007/143554 | 12/2007 |
| WO | 2008/070871 | 6/2008 |

OTHER PUBLICATIONS

KR 2004005427 machine translation.*

International Search Report for PCT/US07/69031 dated Jan. 22, 2008.

Tang et al., "Hop Reservation Multiple Access (HRMA) for Multichannel Packet Radio Networks," IEEE Computer Communications Networks, 1998 Proceedings, 7th International Conference, p. 388-395, Oct. 12-15, 1998.

Tang et al., "A Protocol for Topology-Dependent Transmission Scheduling in Wireless Networks," IEEE Wireless Communication and Networking Conference 1999 (WCNC '99), p. 1333-1337 Sep. 1999.

Bao et al., "Collision-Free Topology-Dependent Channel Access Scheduling," Oct. 22, 2000-Oct. 25, 2000, MILCOM 2000. 21st Century Military Communication Conference Proceedings, vol. 1, pp. 507-511.

Bao et al., "Distributed dynamic access scheduling for ad hoc networks," Journal of Parallel and Distributed Computing, Apr. 13, 2003, Elsevier Science, vol. 63, Issue 1, pp. 3-14.

Tang et al., "Interference-Aware Topology Control and QoS Routing in Multi-Channel Wireless Mesh Networks, 2005, International Symposium on mobile Ad Hoc Networking and Computing," Proceedings of the 6th ACM International Symposium on Mobile ad hoc networking and computing, pp. 68-77.

Alicherry, Mansoor et al., "Joint Channel Assignment and Routing for Throughput Optimization in Multi-radio Wireless Mesh Networks," MobiHoc'05, pp. 58-72 (Aug. 28-Sep. 2, 2005).

Bahl, Paramvir et al., "SSCH: Slotted Seeded Channel Hopping for Capacity Improvement in IEEE 802.11 Ad-Hoc Wireless Networks," MobiCom'04, pp. 216-230 (Sep. 26-Oct. 1, 2004).

Kodialam, Murali et al., "Characterizing Achievable Rates in Multi-Hop Wireless Mesh Networks With Orthogonal Channels," IEEE/ACM Transactions on Networking, 13(4):868-880 (Aug. 2005).

Kodialam, Murali et al., "Characterizing the Capacity Region in Multi-Radio Multi-Channel Wireless Mesh Networks," MobiCom'05, pp. 73-87 (Aug. 28-Sep. 2, 2005).

Mishra, Arunesh et al., "Weighted Coloring based Channel Assignment for WLANs," Mobile Computing and Communications Review, 9(3):19-31 (2005).

Ramachandran, Krishna N. et al., "Interference-Aware Channel Assignment in Multi-Radio Wireless Mesh Networks," Proceedings IEEE Infocom, pp. 1-12 (Apr. 2006).

Raman, Bhaskaran, "Channel Allocation in 802.11-based Mesh Networks," Proceedings IEEE Infocom, pp. 1-10 (2006).

Raniwala, Ashish et al., "Architecture and Algorithms for an IEEE 802.11-Based Multi-Channel Wireless Mesh Network," IEEE, 2223-2234 (2005).

Raniwala, Ashish et al., "Centralized Channel Assignment and Routing Algorithms for Multi-Channel Wireless Mesh Networks," Mobile Computing and Communications Review, 8(2):50-65 (2004).

So, Jungmin et al., "Multi-Channel MAC for Ad Hoc Networks: Handling Multi-Channel Hidden Terminals Using a Single Transceiver," MobiHoc'04, pp. 222-233 (May 24-26, 2004).

Tang et al., "Interference-Aware Topology Control and QoS Routing in Multi-Channel Wireless Mesh Networks, 2005, International Symposium on mobile Ad Hoc Networking and Computing," Proceedings of the 6th ACM International Symposium on Mobile ad hoc networking and computing, pp. 68-77 (May 25-27, 2005).

Written Opinion for PCT/US07/69031 mailed Jan. 22, 2008 (pp. 1-4).

International Preliminary Examination Report on PCT/US03/34799, completed Jan. 6, 2005.

International Preliminary Examination Report on PCT/US03/34884, completed Feb. 7, 2005.

International Preliminary Report on Patentability for PCT/US2007/069031, issued Nov. 17, 2008.

International Search Report for PCT/US03/34884, mailed Nov. 30, 2004.

International Search Report on PCT/US03/34799, mailed Oct. 12, 2004.

Notice of Allowance on U.S. Appl. No. 11/741,630, mailed Dec. 27, 2011.

Notice of Allowance on U.S. Appl. No. 12/950,558, mailed Aug. 20, 2013.

* cited by examiner

SYSTEMS AND METHODS FOR VOICE AND VIDEO COMMUNICATION OVER A WIRELESS NETWORK

RELATED APPLICATIONS

This application Ser. No. 11/741,637 is continuation-in-part of Ser. No. 11/462,663, filed Aug. 4, 2006 Ser. No. 11/462,663 is a continuation of Ser. No. 11/420,668, filed May 26, 2006 Ser. No. 11/420,668 is a continuation-in-part of Ser. No. 10/816,481, filed Apr. 1, 2004 Ser. No. 10/816,481 is a continuation-in-part of Ser. No. 10/437,128 filed May 13, 2003 Ser. No. 10/437,128 claims priority to 60/380,425 filed May 13, 2002 Ser. No. 10/816,481 is a continuation-in-part of Ser. No. 10/437,129 filed May 13, 2003 Ser. No. 10/437,129 claims priority to 60/380,425 filed May 13, 2002 Ser. No. 11/420,668 is a continuation-in-part of Ser. No. 11/076,738, filed Mar. 9, 2005 Ser. No. 11/076,738 is a continuation-in-part of Ser. No. 10/816,481, filed Apr. 1, 2004 Ser. No. 10/816,481 is a continuation-in-part of Ser. No. 10/437,128 filed May 13, 2003 Ser. No. 10/437,128 claims priority to 60/380,425 filed May 13, 2002 Ser. No. 10/816,481 is a continuation-in-part of Ser. No. 10/437,129 filed May 13, 2003 Ser. No. 10/437,129 claims priority to 60/380,425 filed May 13, 2002 Ser. No. 11/076,738 is a continuation-in-part of Ser. No. 10/437,128 Ser. No. 10/437,128 claims priority to 60/380,425 filed May 13, 2002 Ser. No. 11/076,738 is a continuation-in-part of Ser. No. 10/437,129 Ser. No. 10/437,129 claims priority to 60/380,425 filed May 13, 2002 Ser. No. 11/420,668 is a continuation-in-part of Ser. No. 10/437,128 Ser. No. 10/437,128 claims priority to 60/380,425 filed May 13, 2002 Ser. No. 11/420,668 is a continuation-in-part of Ser. No. 10/437,129 Ser. No. 10/437,129 claims priority to 60/380,425 filed May 13, 2002 Ser. No. 11/420,668 claims the benefit of 60/747,409 filed May 16, 2006; and Ser. No. 11/741,637 is continuation-in-part of Ser. No. Ser. No. 11/615,582, filed Dec. 22, 2006 Ser. No. 11/615,582 is a continuation-in-part of Ser. No. 11/462,663, filed Aug. 4, 2006 Ser. No. 11/462,663 is a continuation-in-part to 10/816,481 filed Apr. 1, 2004 Ser. No. 10/816,481 is a continuation-in-part of Ser. No. 10/437,128 filed May 13, 2003 Ser. No. 10/437,128 claims priority to 60/380,425 filed May 13, 2002 Ser. No. 10/816,481 is a continuation-in-part of Ser. No. 10/437,129 filed May 13, 2003 Ser. No. 10/437,129 claims priority to 60/380,425 filed May 13, 2002 Ser. No. 11/462,663 is a continuation-in-part of Ser. No. 11/420,668, filed May 26, 2006 Ser. No. 11/420,668 is a continuation-in-part of Ser. No. 10/816,481, filed Apr. 1, 2004 Ser. No. 10/816,481 is a continuation-in-part of Ser. No. 10/437,128 filed May 13, 2003 Ser. No. 10/437,128 claims priority to 60/380,425 filed May 13, 2002 Ser. No. 10/816,481 is a continuation-in-part of Ser. No. 10/437,129 filed May 13, 2003 Ser. No. 10/437,129 claims priority to 60/380,425 filed May 13, 2002 Ser. No. 11/420,668 is a continuation-in-part of Ser. No. 11/076,738, filed Mar. 9, 2005 Ser. No. 11/076,738 is a continuation-in-part of Ser. No. 10/816,481, filed Apr. 1, 2004 Ser. No. 10/816,481 is a continuation-in-part of Ser. No. 10/437,128 filed May 13, 2003 Ser. No. 10/437,128 claims priority to 60/380,425 filed May 13, 2002 Ser. No. 10/816,481 is a continuation-in-part of Ser. No. 10/437,129 filed May 13, 2003 Ser. No. 10/437,129 claims priority to 60/380,425 filed May 13, 2002 Ser. No. 11/420,668 is a continuation-in-part of Ser. No. 10/437,128 Ser. No. 10/437,128 claims priority to 60/380,425 filed May 13, 2002 Ser. No. 11/420,668 is a continuation-in-part of Ser. No. 10/437,129 Ser. No. 10/437,129 claims priority to 60/380,425 filed May 13, 2002 Ser. No. 11/420,668 claims the benefit of 60/747,409 filed May 16, 2006 Ser. No. 11/462,663 is a continuation-in-part of Ser. No. 11/076,738 filed Mar. 9, 2005 Ser. No. 11/076,738 is a continuation-in-part of Ser. No. 10/816,481, filed Apr. 1, 2004 Ser. No. 10/816,481 is a continuation-in-part of Ser. No. 10/437,128 filed May 13, 2003 Ser. No. 10/437,128 claims priority to 60/380,425 filed May 13, 2002 Ser. No. 10/816,481 is a continuation-in-part of Ser. No. 10/437,129 filed May 13, 2003 Ser. No. 10/437,129 claims priority to 60/380,425 filed May 13, 2002 Ser. No. 11/076,738 is a continuation-in-part of Ser. No. 10/437,128 Ser. No. 10/437,128 claims priority to 60/380,425 filed May 13, 2002 Ser. No. 11/076,738 is a continuation-in-part of Ser. No. 10/437,129 Ser. No. 10/437,129 claims priority to 60/380,425 filed May 13, 2002 Ser. No. 11/615,582 is further a continuation-in-part of Ser. No. 10/816,481, filed Apr. 1, 2004 Ser. No. 10/816,481 is a continuation-in-part of Ser. No. 10/437,128 filed May 13, 2003 Ser. No. 10/437,128 claims priority to 60/380,425 filed May 13, 2002 Ser. No. 10/816,481 is a continuation-in-part of Ser. No. 10/437,129 filed May 13, 2003 Ser. No. 10/437,129 claims priority to 60/380,425 filed May 13, 2002; and each of the above identified applications are hereby incorporated by reference in their entirety.

BACKGROUND

1. Field of the Invention

The present invention generally relates to wireless communication networks and more specifically to voice communication over a wireless mesh network or a wireless ad hoc network, or a wireless multihop network.

2. Related Art

The use of voice over Internet Protocol (VoIP) enabled devices for communication is growing in popularity; as is the use of video and multimedia over IP networks (IPTV, etc.). Using VoIP (or IPTV), voice and video information is packetized as IP packets and transmitted over the Internet Protocol packet switching network rather than using the circuit switching network such as the public switched telephone network (PSTN). Originally, VoIP supported transmission between two devices, such as two computers, over the Internet. While this was useful, it required that a user have a device connected to the Internet that included VoIP software. Recently, gateway servers have been introduced that can act as an interface between the Internet and the PSTN. These gateway servers enable devices on the Internet to communicate with devices, such as standard telephones, that are on the PSTN. Likewise, two devices on the PSTN can communicate with each other via the Internet.

Local area networks typically have many users, and can provide the users access to the Internet. A typical local area network, such as a wireless network, includes a number of wireless nodes, such as switches and routers, and a number of client devices. The client devices can include computers, personal digital assistants, and the like. In a wireless network, as a user moves about their network connectivity is maintained by accessing various access points that are part of the network. A problem can arise if a user enters an area that is not covered by an access point, or if there are too many users trying to access an individual access point. One solution would be to install additional access points, but this can be expensive as well as wasting network resources because many of the access points may be idle a majority of the time.

Therefore, there is a need for a system and method that overcomes problems associated with VoIP over a wireless mesh network.

SUMMARY

The present invention provides systems and methods for communicating voice and/or video over a wireless network. In one embodiment, a signal, formatted as voice over Internet protocol (VoIP) data, is received from a device. The signal is adapted for a wireless network, such as a wireless mesh network, and then transmitted to the wireless network. Signals are also received from the wireless network and adapted to a VoIP formatted signal and transmitted to the device. The signals transmitted between the VoIP device and the network include voice traffic as well as multimedia, such as video and other high bandwidth signals.

The VoIP device can include a Wi-Fi hard-phone, a Wi-Fi soft-phone, a dual-mode phone, a UWB phone, a phone with a Bluetooth interface, or any other VoIP enable device. In addition, a device that interacts with the network can be any consumer electronic device that has voice or video capability, such as a wireless gaming device, an IPTV, a wireless music player, etc. Also, the wireless network, such as a mesh/ad hoc/or multihop network, can include an Internet Protocol Private Branch Exchange ("PBX").

In another embodiment, a node in a wireless network can include a topology module adapted to align the node's beacon signal with a network, and a signaling module that is adapted to send and receive MAC layer control and signaling messages. The node also includes a VoIP module adapted to receive signals from a VoIP device and to communicate the signals to the signaling module to be transmitted to the wireless network. The VoIP module also receives signals from the signaling module and transmits the received signals to the VoIP device.

In still another embodiment, a node in a wireless mesh network can include a topology module adapted to align the node's beacon signal with a mesh network, and a signaling module is adapted to send and receive MAC layer control and signaling messages. The node also includes an audio module adapted to receive audio signals from an audio input device and to communicate the signals to the signaling module to be transmitted to the mesh network. The audio module also receives signals from the signaling module and transmits the received signals to an audio output device. The audio module can include an analog to digital converted for digitizing an analog audio signal and adapting the digitized signal for communication to the signaling module. In addition, the audio module can include a digital to analog converter for converting a digital signal to an analog signal and then communicating the analog signal to an audio output device. An example of an audio input device includes a microphone, and an example of an audio output device includes a speaker.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for systems and methods for improving VoIP operation. After reading this description it will become apparent to one skilled in the art how to implement the invention in various alternative embodiments and alternative applications. To facilitate a direct explanation of the invention, the present description will focus on embodiments where communication is carried out using traditional radio frequency ("RF") and ultra wideband ("UWB"), although the invention may be applied in alternative networks IEEE 802.11 802.15, 802.16, worldwide interoperability for microwave access ("WiMAX") network, wireless fidelity ("WiFi") network, wireless cellular network (e.g., wireless wide area network ("WAN"), ZigBee, and/or any other wireless communication network topology or protocol). Additionally, the described embodiment will also focus on a single radio embodiment although multi-radio embodiments and other multiple input multiple output ("MIMO") embodiments are certainly contemplated by the broad scope of the present invention. Therefore, it should be understood that the single radio embodiment described herein is presented by way of example only, and not limitation. As such, this detailed description should not be construed to limit the scope or breadth of the present invention as set forth in the appended claims.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
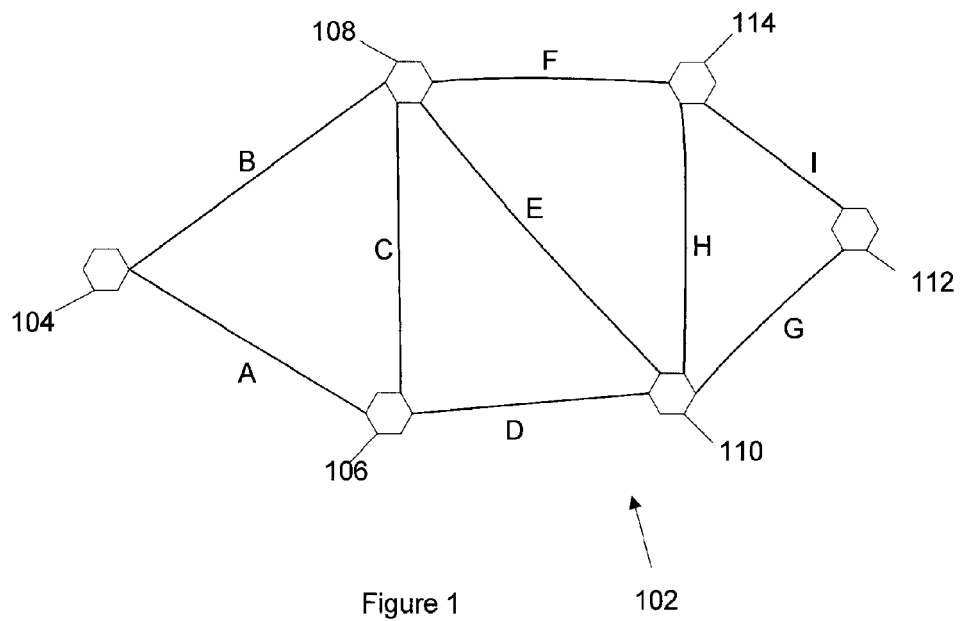
FIG. 1 is a network diagram illustrating an example wireless mesh network in accordance with an embodiment of the invention.

FIG. 1 is a network diagram illustrating an example wireless network 102 in accordance with aspects of the present invention. In one embodiment, the wireless network is a wireless mesh network. A mesh network is a general network architecture that can include point-to-point, star, bus hierarchical, partial, or full mesh configurations. In the illustrated embodiment, the network 102 comprises a plurality of wireless communication devices, or nodes (also referred to herein as "wireless nodes" or "wireless devices") such as wireless nodes 104, 106, 108, 110, 112, and 114. Additionally illustrated are several wireless communication paths (also referred to herein as "links") between the various wireless nodes, for example link A between node 104 and node 106. A path may also comprise a plurality of links, such as the path between node 104 and 106 that includes links B, and C, or alternatively, links B, E, and D. Such conventional communications between nodes in wireless communication network (also referred to herein as an "ad hoc network" or "wireless network" or "wireless ad hoc network" or "mesh network" or some combination of these) will be understood by one having skill in the art.

Furthermore, each wireless node in the illustrated diagram has a maximum communication distance within the wireless communication network. This distance is not shown, however, it can be understood such that node 104 cannot directly communicate with node 112 and vice versa.

Figure 2A:
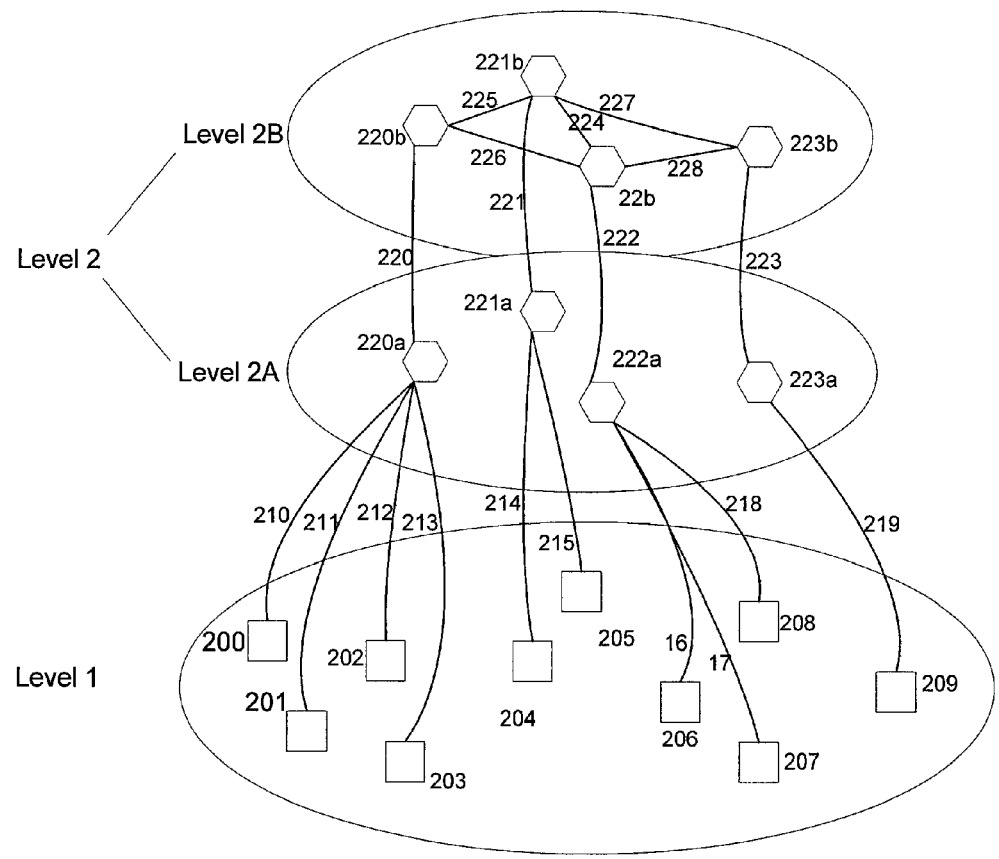
FIG. 2A is a network diagram illustrating another example wireless mesh/ad hoc/or multihop network.

In an alternative arrangement, the wireless network may be organized as two or more hierarchies. Referring to FIG. 2A, at the lowest hierarchy (level 1), a client device (200, 201, . . . , 209) is equipped with a wireless interface unit running a networking protocol to communicate with the wireless nodes (e.g. routers or switches 220a, 221a, 222a, 223a) in the next hierarchy (level 2a). Wireless nodes (220b, 221b, 222b, 223b) in level 2b can be interconnected by a separate set of wireless links (224, 225, 226, 227, 228) of the mesh network. Specifically, each level 2a node (220a, 221a, 222a, 223a) is connected to an adjunct node (220b, 221b, 222b, 223b) via a wire, or wireless, link (220, 221, 222, 223). These adjunct nodes in level 2b (220b 221b, 222b, 223b) form a mesh network that interconnects all the client (level 1) nodes (200, 201, . . . , 209) via the level 2a nodes (220a, 221a, 222a, 223a).

Furthermore, a level 2a node and its adjunct level 2b node can be combined into a single physical node, with two logical interfaces. Each of the logical interfaces can operate on separate physical interfaces, or separate channels (frequency) on the same physical interface.

In one embodiment, peer-to-peer (P2P) network relies on the processing power and bandwidth of the participants in the network rather than concentrating it in a small number of servers. A P2P network can be used for connecting nodes via largely ad hoc connections, i.e. without access to an infrastructure network such as a WAN, PSTN or WLAN.

Multicast is a technique for efficient information delivery to a group of destinations simultaneously. Using this technique information is delivered over each link of the network only once, creating copies only when the links to the destinations split. In IP Multicast implementation the routers create optimal distribution paths for data packets sent to a multicast destination address spanning tree in realtime.

Figure 2B:
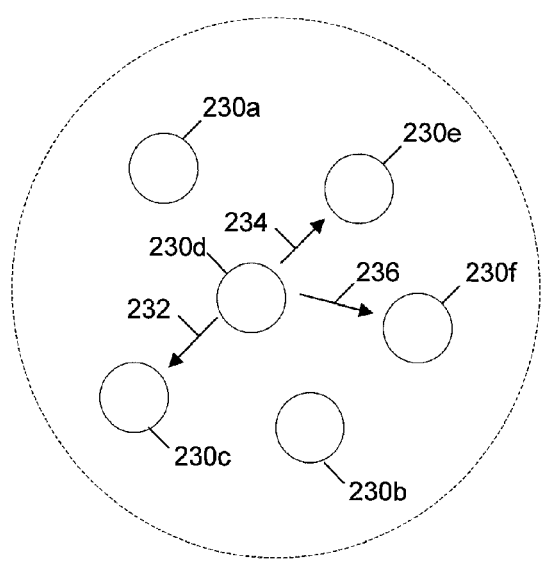
FIG. 2B is a network diagram illustrating an example peer-to-peer wireless network.

FIG. 2B is a network diagram of an example peer-to-peer network. As shown in FIG. 2B multiple peers, or nodes, 230 a-f are in communication with each other to form the peer-to-peer network. In the example of FIG. 2B one node 230d distributes data via one-hop multicast communication links 232, 234, and 236 to three other peers 230c, 230e, and 230f. In the other embodiments different nodes or peers can distribute data to other combination of nodes or peers.

Figure 2C:
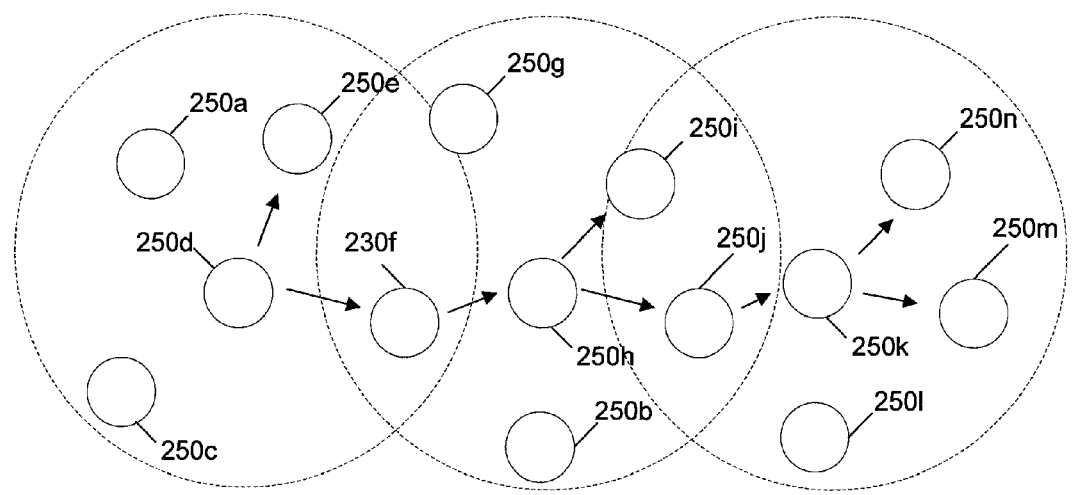
FIG. 2C is a network diagram illustrating another example peer-to-peer wireless network.

The 1-hop P2P network illustrated in FIG. 2B can be generalized to a multi-hop P2P network. FIG. 2C is a network diagram illustrating an example embodiment of a multi-hop P2P network. In the example of FIG. 2C there are fourteen peers, or nodes, 250 *a-n*. In this example a first peer 250*d* multicast data to a second and third peer 250*e* and 250*f*. The third peer 250*f* re-multicasts, the data to a fourth peer 250*h*. The fourth peer 250*h* re-multicasts the data to a fifth and sixth peer 250*i* and 250*j*. The sixth peer 250*j* re-multicasts the data to a seventh peer 250*k*. The seventh peer 250*k* re-multicasts the data to an eighth and ninth peer 250*n* and 250*m*.

In this example the data is re-multicasts, or it multi-hops across the network to multiple peers. FIG. 2C is just an example and other multi-hop paths can be formed in the P2P network.

Figure 3:
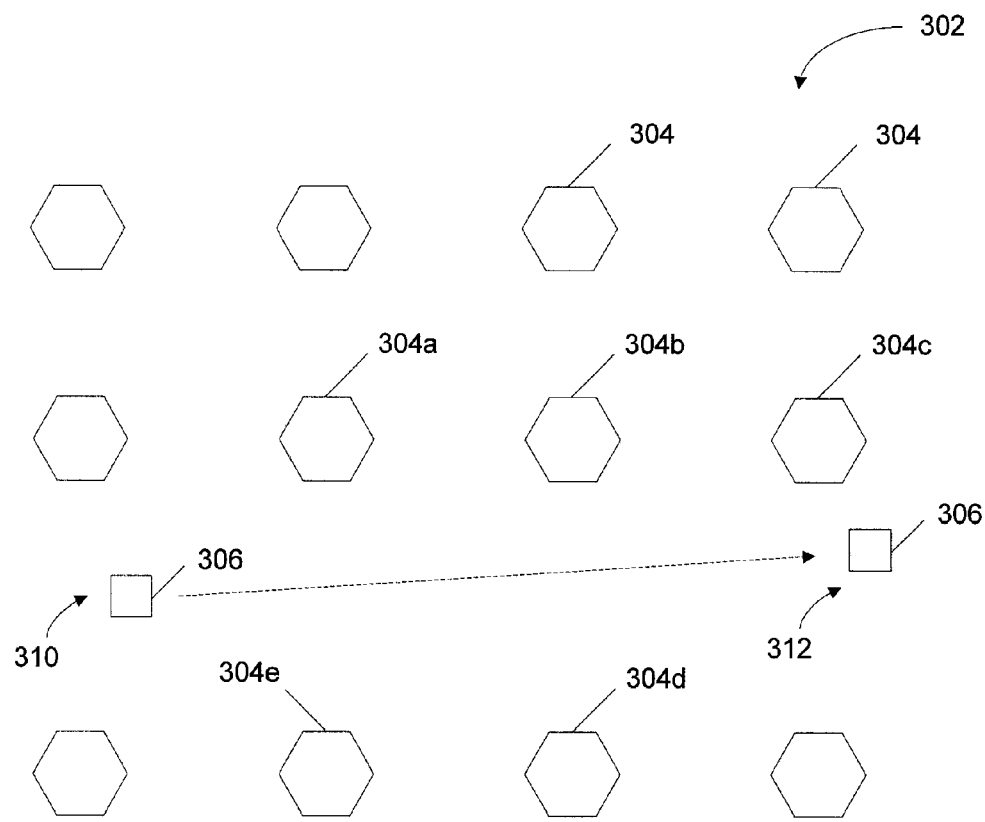
FIG. 3 is a network diagram illustrating aspects of a technique for voice communication over a wireless network.

FIG. 3 is a network diagram illustrating aspects of a technique for voice communication over a wireless mesh network. As shown in the example illustrated in FIG. 3, the network 302 can include network nodes 304 and mobile wireless devices 306. In this example there is only one mobile device 306 illustrated for simplicity, however, a network 302 would typically include multiple mobile wireless devices 306.

In one embodiment, the mobile device 306 can be a VoIP device, such as a phone, and at least some of the networks nodes 304 act as access points providing connectivity of the VoIP device to the mesh network. For example, as the device moves about the network, the device may first access the network through node 304*a*, then 304*b* and then 304*c* as the device 306 moves from a first location 310 to a second location 312.

Figure 4:
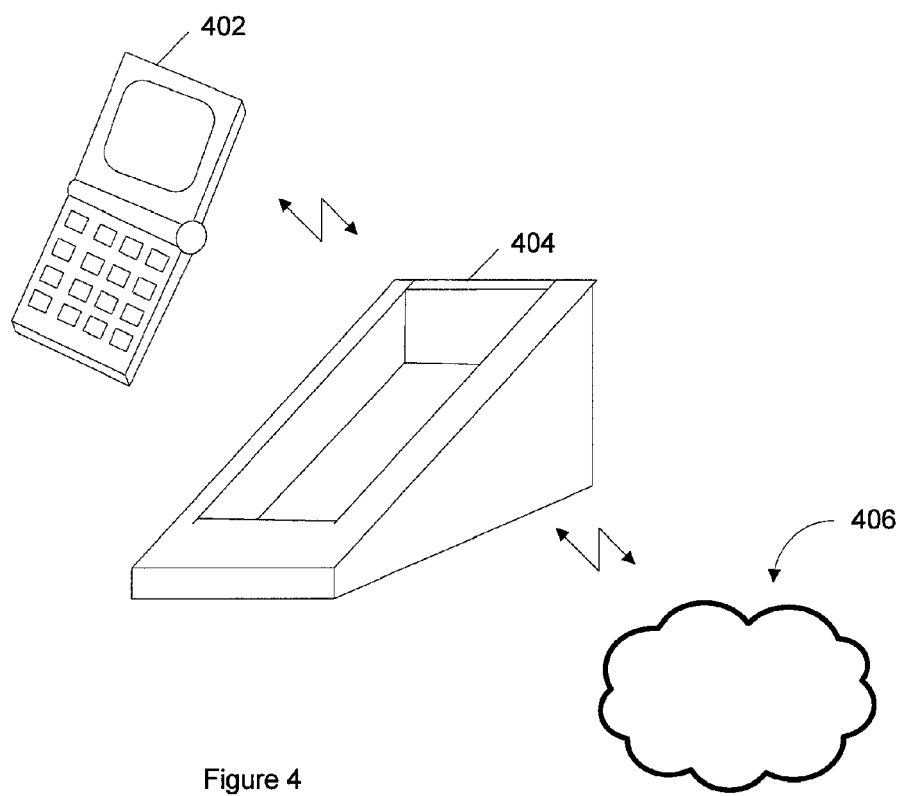
FIG. 4 is a block diagram illustrating an example of a system adapted to communicate with a network.

FIG. 4 is a block diagram illustrating an example of a system adapted to communicate with a wireless network. As shown in FIG. 4, the system can include a VoIP phone 402 and a cradle 404. In one example, the cradle 404 is adapted to perform functions normally associated with a phone cradle, such as charging the phone when it is placed in the cradle. In addition, the cradle 404 is adapted to communicate, and act as an access point for a wireless network, such as a wireless mesh network, a WiFi, or other types of wireless networks. In the example of FIG. 4, the phone 402 can transmit and receive voice and data traffic with the cradle 404. The cradle 404 is also adapted to transmit and receive voice and data traffic with a network 406.

Figure 5:
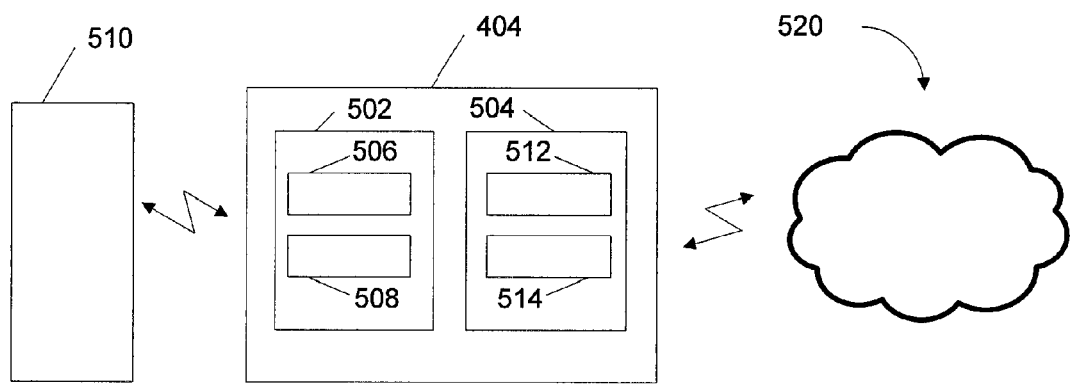
FIG. 5 is a block diagram illustrating an example of a cradle in accordance with an embodiment of the invention.

FIG. 5 is a block diagram illustrating an example of a cradle 404. As shown in FIG. 5, the cradle 404 can include a VoIP interface module 502 and a network interface module 504. The VoIP interface module 502 can include a transmitter 506 and a receiver 508 for communicating with a VoIP device 510. In one example the VoIP device 510 is a phone. In other examples, the VoIP device 510 can be a PDA, a text messaging device, or other wireless communication device. The network interface 504 includes a transmitter 512 and a receiver 514 for communicating with a network 520, such as a mesh network. Communication between the cradle 404 and the network 520 can be wired or wireless. In one embodiment, the network 520 is a mesh network and the cradle 404 communicates with a node in the network.

There are several advantages for having the cradle 404 in communication with the VoIP device 510 and the network 520. For example, the cradle 404 can act as a wireless access point for a VoIP phone, or other VoIP enabled device, to access the network. Using the cradle 404 as an access point can eliminate, or reduce the number of access points needed within a given area. For example, in a home environment, cradles 404 can be distributed throughout different rooms in the house and thereby provide access to a home based network for VoIP devices 510 of family members as they move about the home.

In one example, several family members, each having a VoIP phone would place their respective cradles, or chargers, in desired location throughout the home, such as an office, bedroom, or other desired location. The cradles, acting as access points, and distributed throughout the house, provide improved coverage without the need for additional access points.

Another advantage to having the cradle in communication with the network, is that the cradle is operated off of wall power, as opposed to battery power. Because of the increased power available to the cradle, as compared to a battery operated device, it is possible to push high bandwidth data to the cradle. For example, high bandwidth signals, such as a high definition video, or multimedia, can be pushed to the cradle. The cradle may include data storage to stored the high bandwidth signal and then retransmit it to a wireless device, such as a VoIP device, when the device is within range of the cradle, or transfer the signal to the device when it is placed in the cradle. The cradle could also use other types of wireless interfaces to transfer data to a wireless device. For example, the cradle could use a wireless USB interface or 802.11X interface to communicate data to a device.

Figure 6:
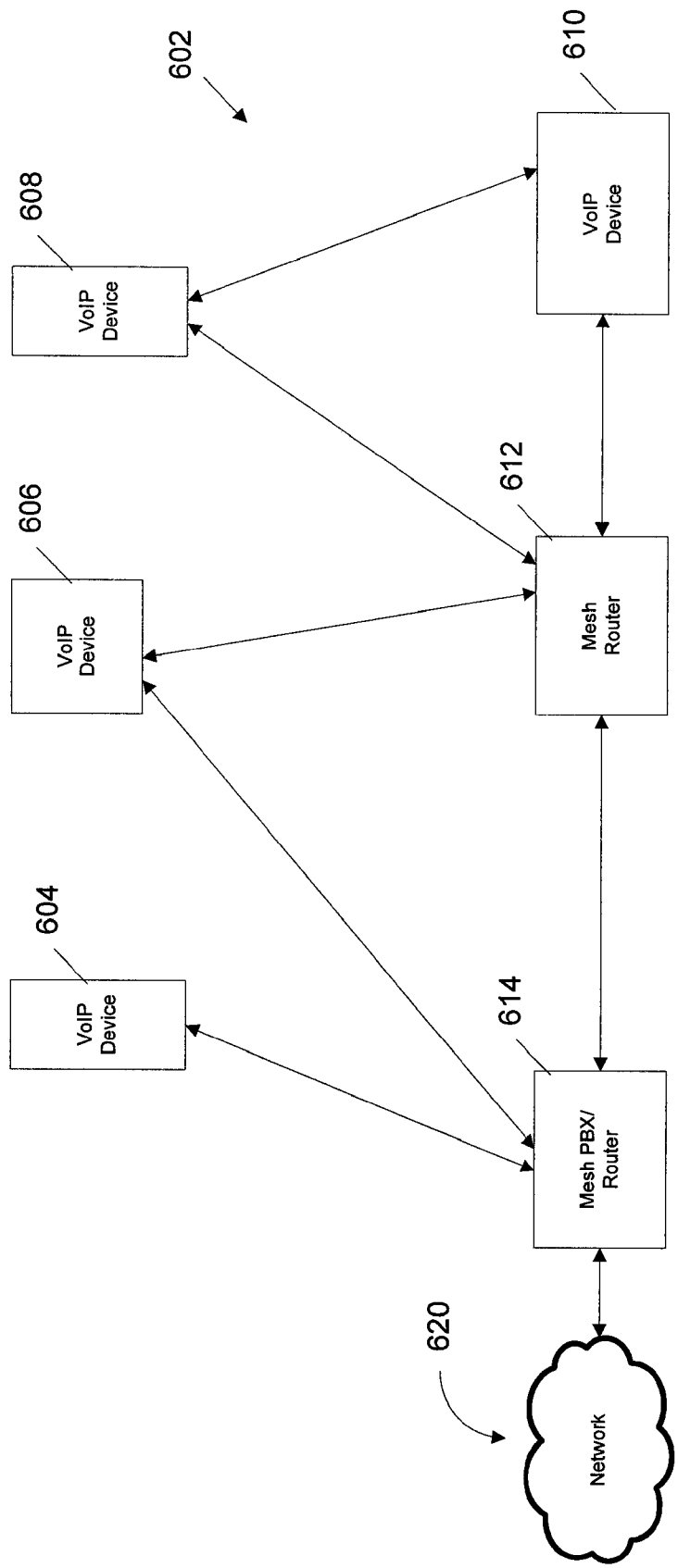
FIG. 6 is a block diagram illustrating another example of a wireless network in accordance with an embodiment of the invention.

FIG. 6 is a block diagram illustrating an example of a mesh network. As illustrated in FIG. 6, the network 602 can include a plurality of VoIP devices 604, 606, 608 and 610. These VoIP devices can include, for example, a WI-FI hard-phone, a WI-FI soft-phone, a dual-mode phone, a mesh phone or other type of VoIP device. In addition, a device that interacts with the network can be any consumer electronic device that has voice or video capability, such as a wireless gaming device, an IPTV, a wireless music player, etc. The example network 602 illustrated in FIG. 6 also includes a mesh router 612 and a mesh private branch exchange (PBX)/router 614. VoIP device 606 has multiple paths over one or more radio links to communicate with the Mesh PBX/router 614. The path selection can be based on service requirements, or wireless environment conditions, or other criteria.

As shown in FIG. 6, a VoIP device 604 can communicate directly with the mesh PBX/router 614. In addition, a VoIP device 606 can communicate with the mesh router 612. In the example where the VoIP device 606 communicates to the mesh router 612, the communication is then passed on to the mesh PBX/router 614. Likewise, a VoIP device 608 can communicate another VoIP device 610. In the example where VoIP device 608 communicates with another VoIP device 610, the second VoIP device 610 accesses a node in the mesh network and passes the communication on to mesh router 612. In addition, the VoIP device 610 receives communication from the mesh router 612 and passes it on to VoIP device 608. The VoIP devices 604, 606, 608 and 610 can communicate with any device in the network 602 that is configured to receive VoIP signals.

In another embodiment, a VoIP device 608 can communicate with another VoIP device within the network 602 through one of the nodes of the mesh network. For example, a first VoIP device 608 can communicate with a second VoIP device 606 through the mesh router 612 or other network node.

Communication from the network 602 can pass through the mesh PBX/router 614 to an external network 620. The external network 620 may be, for example, another mesh network, a wide area network such as the Internet, the Public Switched Telephone Network (PSTN), or any other type of network. For example, in one embodiment, the traffic between the devices within the network 602 is VoIP and the external network 620 is the Internet. Alternatively, the traffic between devices within the network 602 is Bluetooth and the external network 620 is the PSTN. Likewise, the traffic between the devices within the network 602 can be combinations of different types of traffic, such as VoIP wireless USB, and Bluetooth.

Figure 7:
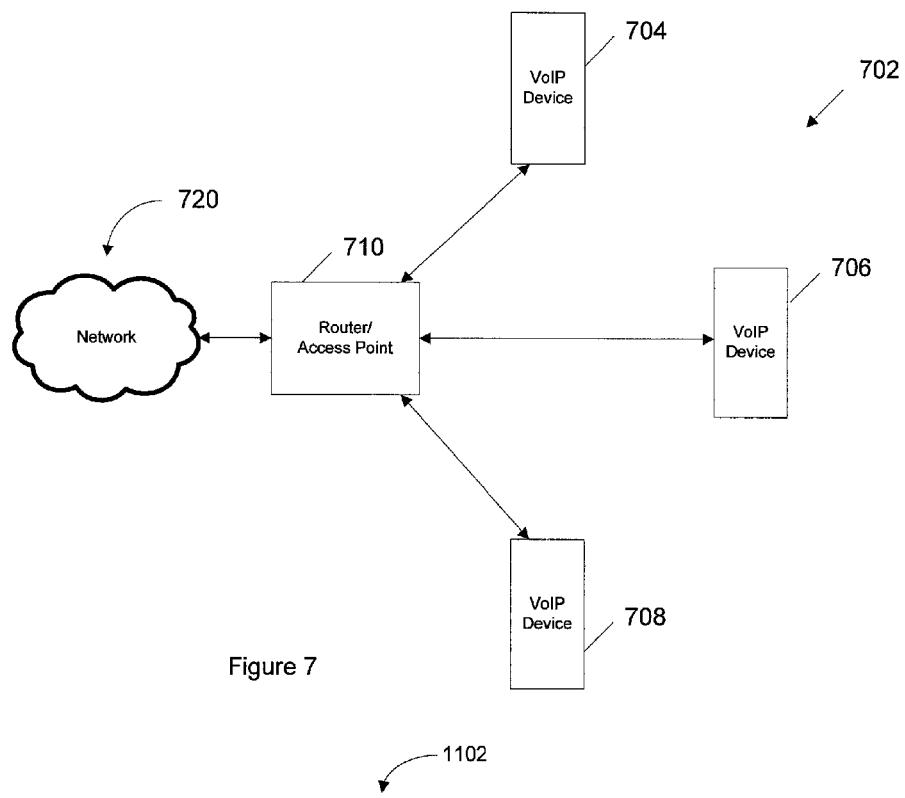
FIG. 7 is a block diagram of still another example of a wireless network in accordance with an embodiment of the invention.

FIG. 7 is a block diagram of another example of a mesh network 702. In the example of FIG. 7, the network 702 includes a plurality of VoIP devices 704, 706 and 708. In this example network 702 all of the VoIP devices are in direct communication with a router/access point 710. Communication from the VoIP devices 704, 706 and 708 pass through the router/access point 710 to an external network 720. The external network can be another mesh network, or a wide area network, such as the Internet, or other type of network. In another embodiment, the VoIP devices 704, 706 and 708 can also communicate with each other. For example, a first VoIP device 704 may communicate with a second VoIP device 708 through the router/access point 710. Likewise, multiple VoIP devices 704, 706, and 708 can communicate with each other in a type of conference call.

Figure 8:
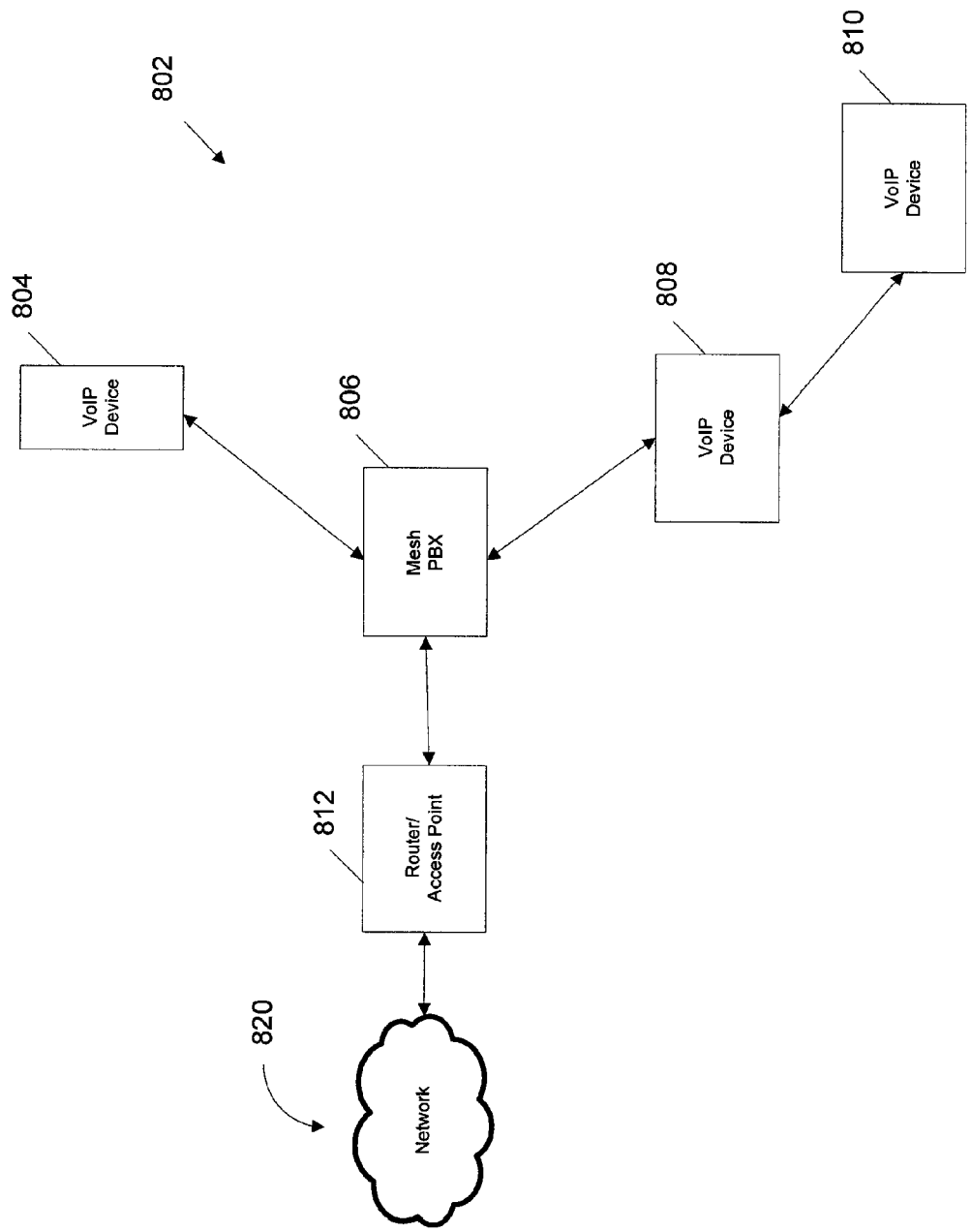
FIG. 8 is a block diagram of yet another example of a network in accordance with an embodiment of the invention.

FIG. 8 is a block diagram of yet another example of a network. As illustrated in FIG. 8, the network, for example a mesh network 802 includes plurality of VoIP devices 804, 806, 808 and 810. In this example, a first VoIP device 806 is performing the functions of a mesh PBX. Thus, the other VoIP devices 804, 808 and 810 transmit and receive VoIP messages through the PBX 806. The PBX is in communication with a router/access point 812 that routes traffic to and from an external network 820. The external network 820 can be another mesh network, or a wide area network such as the Internet. As illustrated in FIG. 8, VoIP devices 804, 808 can communicate directly with the PBX device 806. In addition, a first VoIP device 810 can communicate with another VoIP device 808 which accesses the PBX device 806 to allow the first VoIP device 810 to access the network.

In an embodiment, multiple devices, such as VoIP devices 810, 808 and 804, can communicate with each other without a carrier or other infrastructure network. In other words, multiple devices can communicate with each other without utilizing a network access point, mesh routers, or the like. In this way the devices form a wireless peer-to-peer (P2P) network. The devices may have self-organizing capability (an ad hoc network) and they may configure a flat or other P2P network structure, such as a star, bus, tree, hierarchical, or cluster of devices.

In one embodiment, a multicast tree can be constructed and overlaid on a wireless P2P network to facilitate distribution of various types of data, such as video, voice, or other multimedia data. In addition, a device can broadcast, or multicast, to other devices in the P2P network. The P2P network can also be used for applications such as social networking and various types of file exchange networks. In another embodiment, voice, video, data, or other types of files or calls, can be exchanged between two or more peers over direct logical communication links among the devices. The logical communication links can include a single physical radio link, or multiple physical radio links in succession, such as a relay or multi-hop networking. The embodiments of the P2P networks can enable location and presence based services, mobile search, social networking, and other types of services.

A mesh PBX is responsible for establishing the connection between at least two VoIP devices. This task, however, does not necessarily include VoIP data traffic forwarding once the connection is setup. That is, the PBX may only be involved in VoIP signaling and the data traffic may take a different (and often shorter) path. In addition, multiple PBXs can exist in the same mesh network. The use of multiple PBXs may further improve the scalability of the system. In a scenario where a mesh network includes multiple PBXs, the PBXs may communicate with each other to establish a distributed system and a client device can initiate a connection with a peer VoIP device via any one of these PBXs. In one example, some routers may be equipped with PBX functionality.

Figure 9:
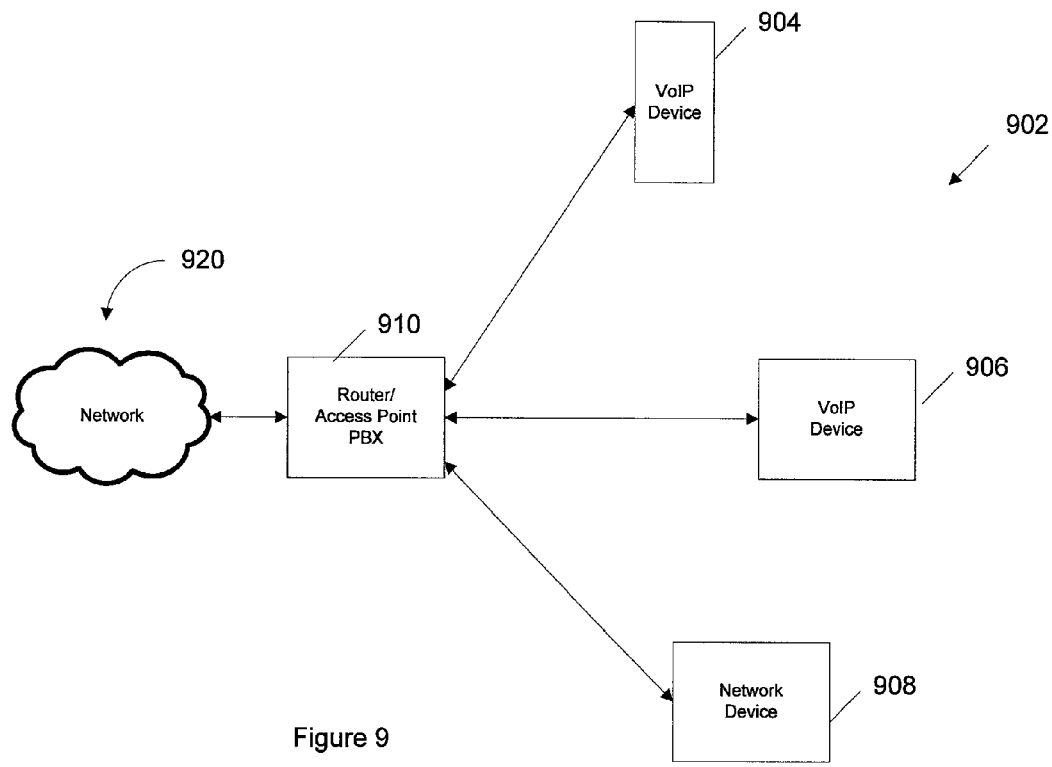
FIG. 9 is a block diagram of still another example of a network in accordance with an embodiment of the invention.

FIG. 9 is a block diagram of still another example network 902. As shown in FIG. 9, the network 902 includes a plurality of VoIP devices 904 and 906. In addition, the network 902 includes other network devices 908 such as printers and other peripheral devices. In this example, VoIP devices in the network communicate with an access point or router 910 that is operating as a PBX. The access point 910 communicates network traffic with an external network 920. The external network 920 can be a mesh network, or a wide area network such as the Internet, or other network.

In the example networks illustrated in FIGS. 1, 2, 3, and 6-9 the communication between various network devices can be wired or wireless. In addition, some devices may communicate to some other devices over a wired connection and to other device over a wireless connection. In addition, communication between network devices 904, 906, 908, and 910, may use other interface, for example, wireless USB, Ultra Wide Band, IEEE 802.11, or other interface.

In the examples discussed above, the PBX offers many advantages. For example, the PBX/router software can be installed and operate in one of the network nodes. The PBX can then support multiple VoIP devices such as soft phones and hard phones. It can also support single-channel CSMA/CA MAC over typical major brand Wi-Fi network interface cards. The PBX also allows web configuration, call admission, and quality of service operations. It can also support location sensing and mapping of devices within the network. Another advantage is that free intra network and inter network calls are supported. Also, VoIP service can be extended to support calls to the Public Switched Telephone Network (PSTN).

In addition, use of a Soft Wi-Fi Gateway (SWG) allows multiple computing devices to wirelessly share a common Wi-Fi Internet connection. In one example, a user would install SWG software on a computing device, and if the computing device has a Wi-Fi Internet subscription, it can share the Internet connection with other computing devices in the network.

The VoIP devices described in the examples above can include Wi-Fi hard-phones, dual-mode phones and Wi-Fi soft-phones. For example, a Wi-Fi soft-phone can install Internet multi-media subsystem software and turn a computing device such as a desktop or laptop or PDA into a Wi-Fi smart-phone.

Figure 10:
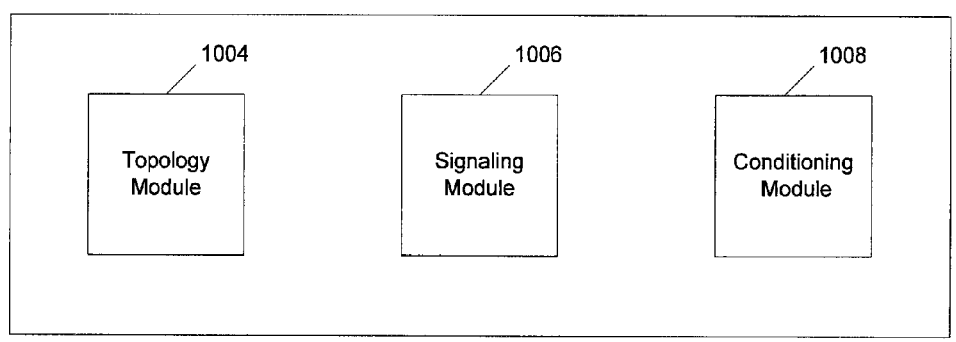
FIG. 10 is a block diagram illustrating an example network node device.

FIG. 10 is a block diagram illustrating an example network node device 1002 according to an embodiment of the present invention. In the illustrated embodiment, the node 1002 includes a topology module 1004, a signaling module 1006, and a conditioning module 1008.

In the example of FIG. 10, the topology module 1004 is configured to align the node's beacon signal with a mesh network. In one embodiment, when a UWB node joins a mesh network, the topology module 1004 accomplishes alignment of the node's beacon signal with the mesh network by receiving and analyzing beacon signals from other nodes within wireless communication range and developing and maintaining a neighbor list that describes the current topology of the wireless network. For example, during the beacon period, the topology module 1004 may receive five beacon signals. Of the five, perhaps only four are received with sufficient signal quality to be considered a neighbor node. Accordingly, each of the four beacon signals are analyzed by the topology module 1004 to identify who the sender node is, what the signal quality is, who the sender node's neighbors are, and other useful information for determining the topology of the wireless network.

The signaling module 1006 is configured to send and receive MAC layer control and signaling messages. The signaling module 1006 also implements optional layer-2 routing. Advantageously, layer-2 signaling and control messages are sent and received in the timeslots in the initial allocation and unicast signaling between nodes is employed by the layer-2 signaling module 1006 in order to increase the reliability of signaling and delivery of control messages.

The conditioning module 1008 is adapted to receive signals from devices, such as VoIP or Bluetooth devices, and to send the signals to the signaling module 1006 to be transmitted to the mesh network. The conditioning module 1008 also receives signals from the mesh network via the signaling module 1006 and outputs signals to the devices, such as VoIP or Bluetooth devices.

Figure 11:
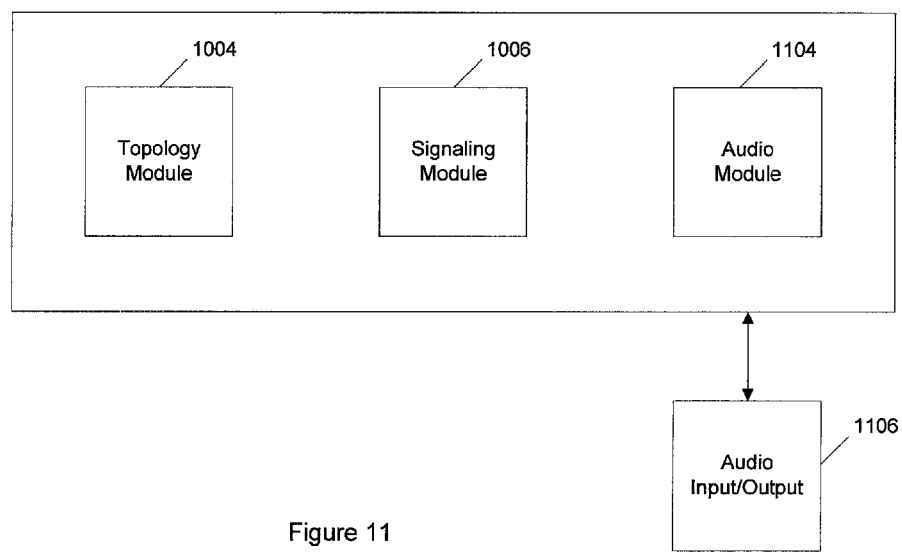
FIG. 11 is a block diagram illustrating an example node, or VoIP device.

FIG. 11 is a block diagram illustrating an example node, such as a Bluetooth or VoIP device 1102 according to an embodiment of the present invention. As shown in FIG. 11, the device 1102 includes a topology module 1004 and signaling module 1006, as described in FIG. 10. The device 1102 also includes an audio module 1104 adapted to communicate with an audio input/output device 1106. In one embodiment, audio signals from the audio input/output device are communicated to the audio module 1104 where the signals are adapted to be communicated to a mesh network. The signals are then sent to the signaling module 1006. Likewise, signals from the signaling module 1006 are communicated to the audio module 1104 where they are adapted and communicated to the audio input/output module 1106.

For example, the audio input/output device 1106 can include a microphone and speaker. A user can speak into the microphone that sends a signal to the audio module 1104. In one embodiment, the signal sent to the audio module 1104 is an analog signal and the audio module 1104 includes a digitizer to convert the signal to analog. In another embodiment, the signal sent to the audio module 1104 is digital. The audio module 1104 conditions the digital data from communication to the signaling module 1006. For example, the audio module 1104 can format the data into a data stream compatible with the signaling module 1006 for transmission to the mesh network. Likewise, signals received from the mesh network are communicated from the signaling module 1006 to the audio module 1104. The audio module 1104 adapts the signals and communicates them to the speaker. In one embodiment, the audio module 1104 includes a digital to analog converter so that analog signals are sent to the speaker. In another embodiment, digital signals are sent to the speaker.

Figure 12:
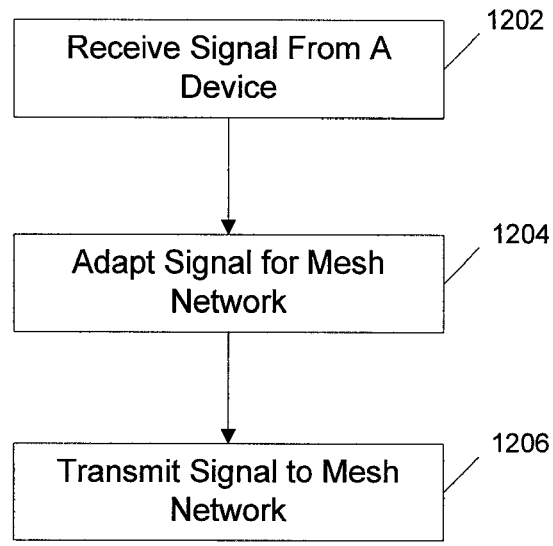
FIG. 12 is a flow diagram illustrating an example process or communication between a VoIP device and a mesh network.

FIG. 12 is a flow diagram illustrating an example process or communication between a device and a mesh network. Flow begins in 1202 where a device such as a network node, or a cradle, as illustrated in FIG. 5 receives a signal, such as Bluetooth or VoIP signal, from a device. Flow continues to block 1204 where the received signal is adapted for transmission to the mesh network. Then, in block 1206 the signal is transmitted to the mesh network.

Figure 13:
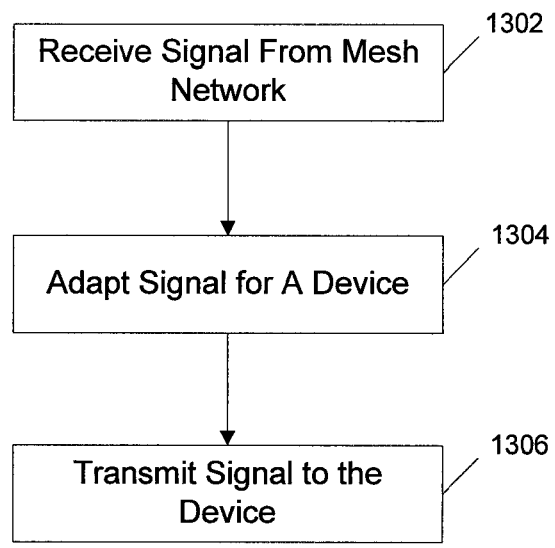
FIG. 13 is a flow diagram illustrating an example process for communicating from a mesh network to a VoIP device.

FIG. 13 is a flow diagram illustrating an example process for communicating from a mesh network to a device. Flow begins in block 1302 where a node in the mesh network, or a cradle, such as illustrated in FIG. 5, receives a signal from the mesh network. Flow continues to block 1304 where the signal is adapted for transmission to a device, such as a Bluetooth or VoIP device. Then, in block 1306 the signal is transmitted to the device.

Figure 14:
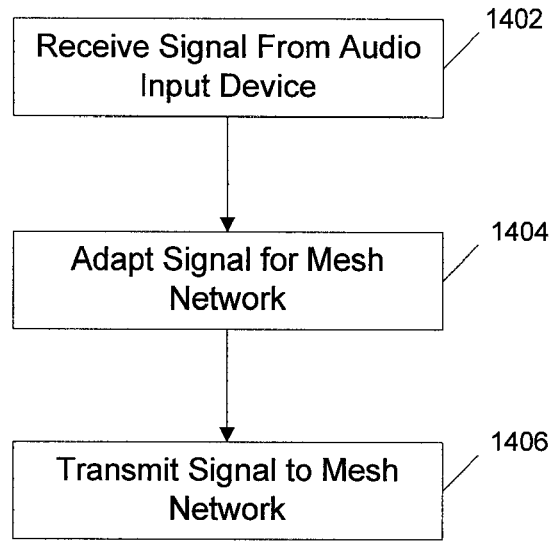
FIG. 14 is a flow diagram illustrating an example process or communication between an audio input device and a VoIP enable node of a mesh network.

FIG. 14 is a flow diagram illustrating an example process or communication between an audio input device and a VoIP enable node of a mesh network. Flow begins in 1402 where a device such as a network node, or a cradle, as illustrated in FIG. 5 receives a signal from the audio input device. Flow continues to block 1404 where the received signal is adapted for transmission to the mesh network. Then, in block 1406 a signal is transmitted to the mesh network.

Figure 15:
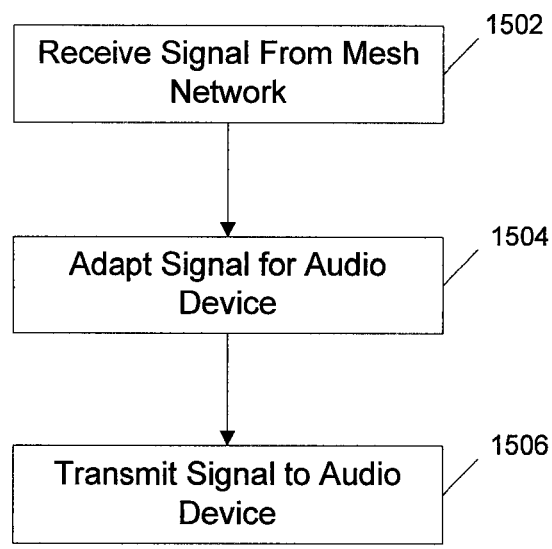
FIG. 15 is a flow diagram illustrating an example process for communicating from a VoIP enabled node of a mesh network to an audio output device.

FIG. 15 is a flow diagram illustrating an example process for communicating from a VoIP enabled node of a mesh network to an audio output device. Flow begins in block 1502 where a node in the mesh network receives a signal from the mesh network. Flow continues to block 1504 where the signal is adapted for transmission to the audio output device. Then, in block 1506 the signal is transmitted to the audio output device.

Figure 16:
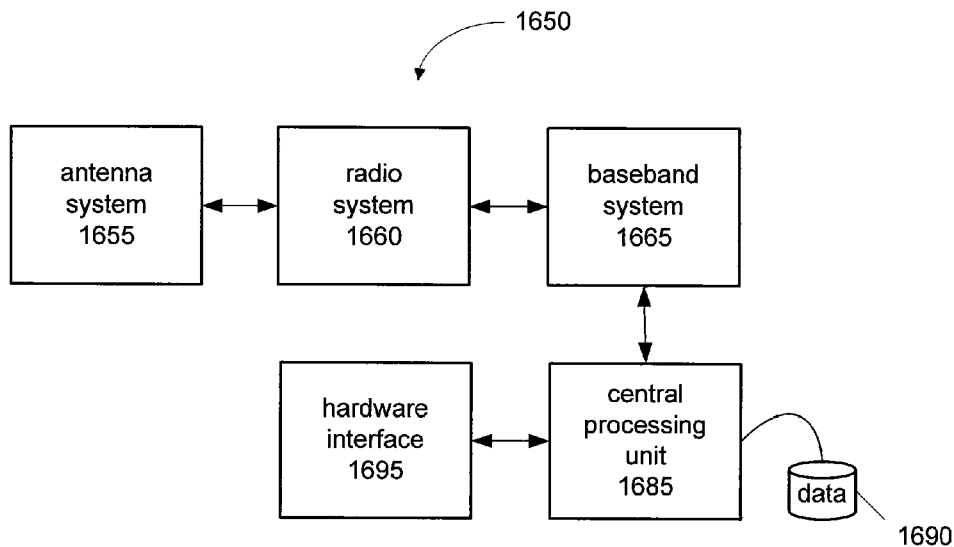
FIG. 16 is a block diagram illustrating an example wireless communication device, or network node, that may be used in connection with various embodiments described herein.

FIG. 16 is a block diagram illustrating an example wireless communication device, or network node, 1650 that may be used in connection with various embodiments described herein. Other wireless communication devices and/or architectures may also be used, as will be clear to those skilled in the art.

In the illustrated embodiment, wireless communication device 1650 comprises an antenna system 1655, a radio system 1660, a baseband system 1665, a central processing unit ("CPU") 1685, a data storage area 1690, and a hardware interface 1695. In one embodiment of the wireless communication device 1650, radio frequency ("RF") signals are transmitted and received over the air by the antenna system 1655 under the management of the radio system 1660. In another embodiment of the wireless communication device 1650, ultra-wideband (UWB) signals are transmitted and received over the air by the antenna system 1655 under the management of the radio system 1660.

In one embodiment, the antenna system 1655 may comprise one or more antennae and one or more multiplexors (not shown) that perform a switching function to provide the antenna system 1655 with transmit and receive signal paths. In the receive path, received signals can be coupled from a multiplexor to a low noise amplifier (not shown) that amplifies the received signal and sends the amplified signal to the radio system 1660.

In alternative embodiments, the radio system 1660 may comprise one or more radios that are configured to communication over various frequencies. In one embodiment, the radio system 1660 may combine a demodulator (not shown) and modulator (not shown) in one integrated circuit ("IC"). The demodulator and modulator can also be separate components. In the incoming path, the signal is demodulated leaving a baseband receive audio signal, which is sent from the radio system 1660 to the baseband system 1665.

In other alternative embodiments, the radio system 1660 may be configured to receive VoIP signals from a device and to adapt the signals and transmit them to a mesh network. Likewise, the radio system 1660 may receive signals from a mesh network and adapt the signals and transmit them to a VoIP device.

In another embodiment, it is advantageous to distribute video information via a logical structure different from the underlying wireless network. For example, in a logical tree topology, bandwidth of each communication path can be dedicated to a video receiver (e.g. HDTV set) at the tree leaf to ensure quality of service. This logical structure can be reorganized in response to equipment failure, congestion or change of data source. Multiple logical trees can also be constructed, each rooted at a data source such as a STB, a residential gateway or a video recorder (e.g. TiVo). Additionally, user devices can communicate with each other directly when they are within certain range thereby bypassing the backbone network.

Figure 17A:
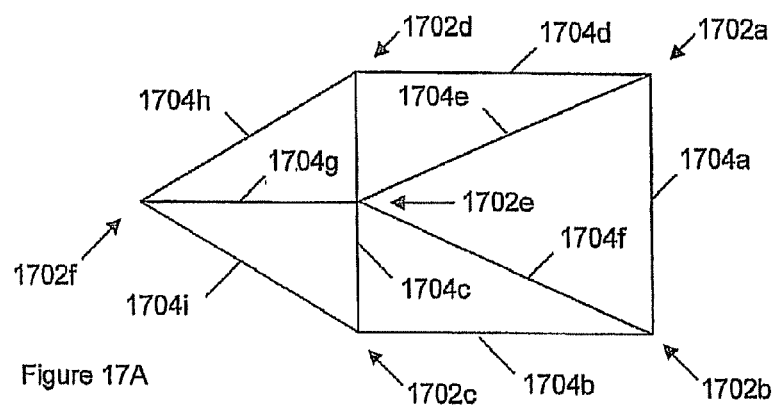
FIG. 17A is a diagram illustrating an example structure of an underlying wireless network.

FIG. 17A is a diagram illustrating an underlying wireless network. As shown in FIG. 17A there are multiple nodes 1702 a-f that are interconnected by multiple links 1704 a-i. The links 1704 a-i can communicate data between the various nodes 1702 a-f.

Figure 17B:
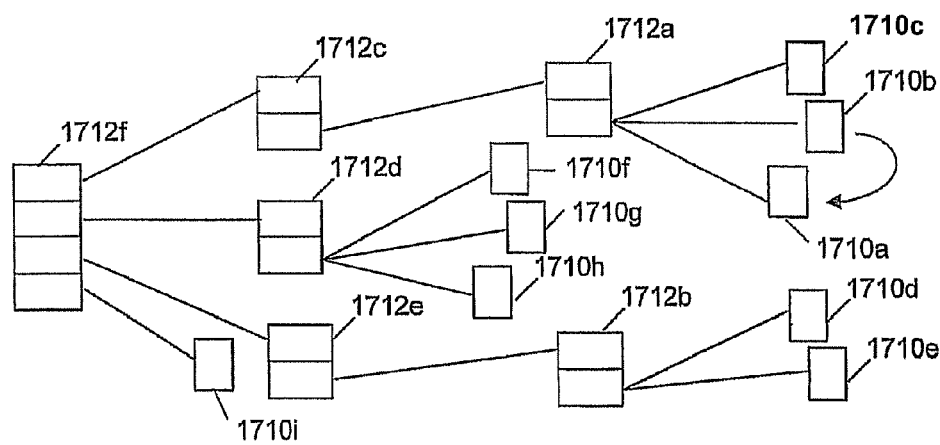
FIG. 17B is a diagram illustrating an example logical distribution network.

FIG. 17B is a diagram illustrating an example logical distribution network. As shown in FIG. 17B peers or clients 1710 a-i can be in communication with relays 1712 a-f. The relays 1712 a-f can communicate data to each other as well as to the peers 1710 a-i. In addition the peers 1710 a-i can be in communication with each other directly. Relay 1712f is sometimes referred to as the "root".

Figure 17C:
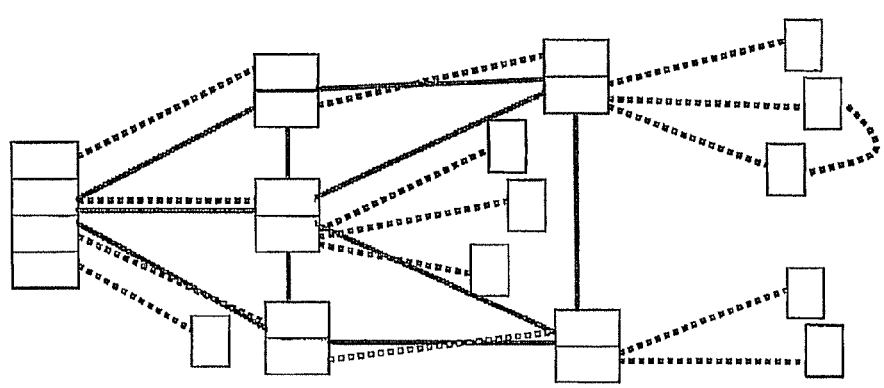
FIG. 17C is a diagram illustrating overlaying the logical distribution network of FIG. 17B on the wireless network of FIG. 17A.

FIG. 17C shows the logical distribution network of FIG. 17B overlaid on to the underlying wireless network structure of FIG. 17A. As illustrated in FIG. 17C the logical distribution network (FIG. 17B) and underlying wireless network (FIG. 17D) operate to provide peer-to-peer and peer-to-relay communication.

In one embodiment, the underlying wireless network (FIG. 17A) is an ad hoc or mesh transport wireless network. In an embodiment, the logical distribution network (FIG. 17B) is a tree, or other topology, and supports the transfer of data, such a video, audio, or other types of data between peers. The logical distribution network can also be a social network.

In an embodiment, peers, or clients, can include HDTV, SDTV, PC, handheld devices or other customer premises equipment (CPE). Typically relays and roots are network devices, such as, routers, access points, switches, etc.

Returning to FIG. 16, the baseband system 1665 is communicatively coupled with the central processing unit 1685. The central processing unit 1685 has access to a data storage area 1690. The central processing unit 1685 is preferably configured to execute instructions (i.e., computer programs or software) that can be stored in the data storage area 1690. Computer programs can also be received from the baseband processor 1665 and stored in the data storage area 1690 or executed upon receipt. Such computer programs, when executed, enable the wireless communication device 1650 to perform the various functions of the present invention as previously described.

In this description, the term "computer readable medium" is used to refer to any media used to provide executable instructions (e.g., software and computer programs) to the wireless communication device 1650 for execution by the central processing unit 1685. Examples of these media include the data storage area 1690, antenna system 1655 (via the baseband system 1665), and hardware interface 1695. These computer readable mediums are means for providing executable code, programming instructions, and software to the wireless communication device 1650. The executable code, programming instructions, and software, when executed by the central processing unit 1685, preferably cause the central processing unit 1685 to perform the inventive features and functions previously described herein.

The central processing unit 1685 is also preferably configured to receive notifications from the hardware interface 1695 when new devices are detected by the hardware interface. Hardware interface 1695 can be a combination electromechanical detector with controlling software that communicates with the CPU 1685 and interacts with new devices. The hardware interface 1695 may be a firewire port, a USB port, a Bluetooth or infrared wireless unit, or any of a variety of wired or wireless access mechanisms. Examples of hardware that may be linked with the device 1650 include data storage devices, computing devices, headphones, microphones, and the like.

Figure 18:
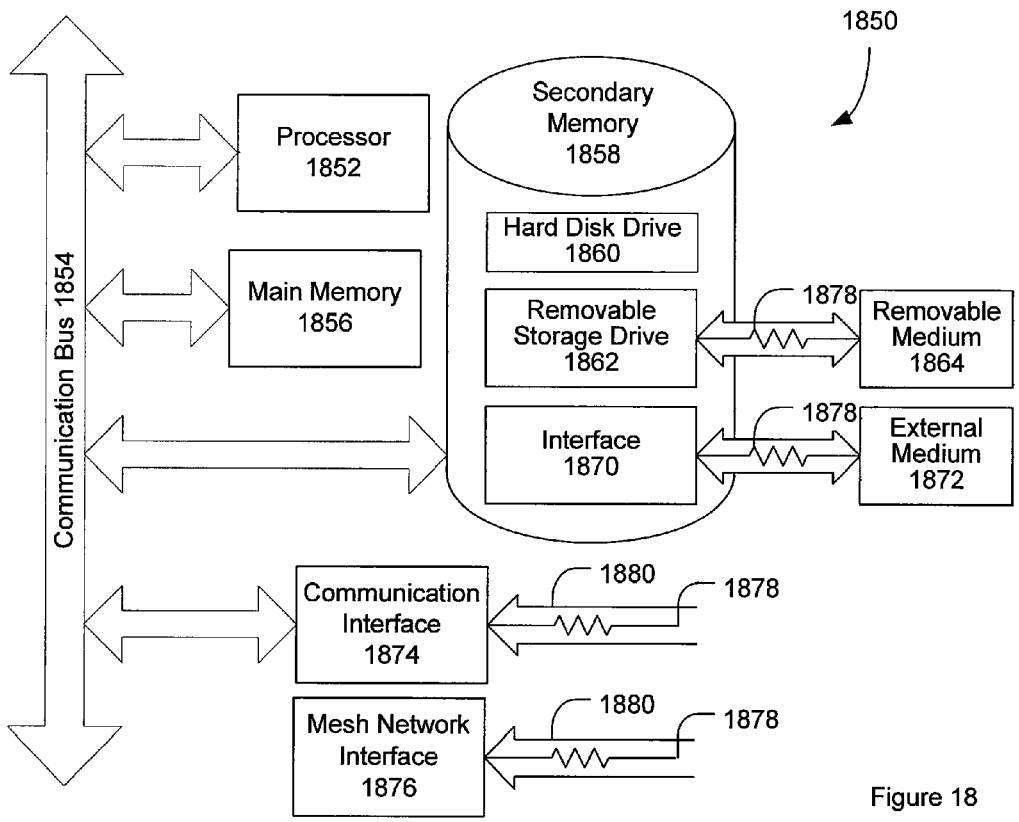
FIG. 18 is a block diagram illustrating an example computer system that may be used in connection with various embodiments described herein.

FIG. 18 is a block diagram illustrating an example computer system 1850 that may be used in connection with various embodiments described herein. For example, a network node, or VoIP device can be implemented in a computer system as illustrated in FIG. 18. Other computer systems and/or architectures may be used, as will be clear to those skilled in the art.

The computer system 1850 preferably includes one or more processors, such as processor 1852. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 1852.

The processor 1852 is preferably connected to a communication bus 1854. The communication bus 1854 may include a data channel for facilitating information transfer between storage and other peripheral components of the computer system 1850. The communication bus 1854 further may provide a set of signals used for communication with the processor 1852, including a data bus, address bus, and control bus (not shown). The communication bus 1854 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 1850 preferably includes a main memory 1856 and may also include a secondary memory 1858. The main memory 1856 provides storage of instructions and data for programs executing on the processor 1852. The main memory 1856 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 1858 may optionally include a hard disk drive 1860 and/or a removable storage drive 1862, for example a floppy disk drive, a magnetic tape drive, a compact disc ("CD") drive, a digital versatile disc ("DVD") drive, etc. The removable storage drive 1862 reads from and/ or writes to a removable storage medium 1864 in a well-known manner. Removable storage medium 1864 may be, for example, a floppy disk, magnetic tape, CD, DVD, etc.

The removable storage medium 1864 is preferably a computer readable medium having stored thereon computer executable code (i.e., software) and/or data. The computer software or data stored on the removable storage medium 1864 is read into the computer system 1850 as electrical communication signals 1878.

In alternative embodiments, secondary memory 1858 may include other similar means for allowing computer programs or other data or instructions to be loaded into the computer system 1850. Such means may include, for example, an external storage medium 1872 and an interface 1870. Examples of external storage medium 1872 may include an external hard disk drive or an external optical drive, or and external magneto-optical drive.

Other examples of secondary memory 1858 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 1872 and interfaces 1870, which allow software and data to be transferred from the removable storage unit 1872 to the computer system 1850.

Computer system 1850 may also include a communication interface 1874. The communication interface 1874 allows software and data to be transferred between computer system 1850 and external devices, such as network nodes, VoIP devices, network devices (e.g. printers), networks, or information sources. For example, computer software or executable code may be transferred to computer system 1850 from a network server via communication interface 1874. Examples of communication interface 1874 include VoIP interface, a modem, a network interface card ("NIC"), a communications port, a Cardbus card, an infrared interface, and an IEEE 1394 fire-wire, just to name a few.

Communication interface 1874 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

The computer system 1850 may also include a mesh network interface 1876. In one example, the mesh network interface 1876 is a wireless interface to a mesh network. In another example, the mesh network interface 1876 is a wired interface to a mesh network, such as a wired interface to a node in the mesh network. In still another example, the interface between the computer system 1850 and a mesh network may be through the communication interface 1874.

Software and data transferred via communication interfaces 1874 and 1876 are generally in the form of electrical communication signals 1878. These signals 1878 are preferably provided to communication interface 1874 via a communication channel 1880. Communication channel 1880 carries signals 1878 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 1856 and/or the secondary memory 1858. Computer programs can also be received via communication interface 1874 and stored in the main memory 1856 and/or the secondary memory 1858. Such computer programs, when executed, enable the computer system 1850 to perform the various functions of the present invention as previously described.

In this description, the term "computer readable medium" is used to refer to any media used to provide computer executable code (e.g., software and computer programs) to the computer system 1850. Examples of these media include main memory 1856, secondary memory 1858 (including hard disk drive 1860, removable storage medium 1864, and external storage medium 1872), and any peripheral device communicatively coupled with communication interface 1874 (including a network information server or other network device). These computer readable mediums are means for providing executable code, programming instructions, and software to the computer system 1850.

In an embodiment that is implemented using software, the software may be stored on a computer readable medium and loaded into computer system 1850 by way of removable storage drive 1862, interface 1870, or communication interface 1874. In such an embodiment, the software is loaded into the computer system 1850 in the form of electrical communication signals 1878. The software, when executed by the processor 1852, preferably causes the processor 1852 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A communication device cradle comprising:
a wireless device interface configured to wirelessly transmit at least one of video or audio data to a wireless communication device;
a wireless network interface configured to transmit data to and receive data from a mesh wireless network, wherein the communication device cradle is configured to;
align a beacon signal with the mesh wireless network by receiving and analyzing beacon signals from neighboring nodes and developing a neighbor list that describes a topology of the mesh wireless network;
wirelessly receive at least one of audio or video data from the mesh wireless network; and
wirelessly transmit the at least one of audio or video data to the mesh wireless communication device; and
a cradle portion configured to accept the wireless communication device and establish direct electrical communication between the communication device cradle and the wireless communication device.

2. The communication device cradle of claim 1, further including data storage configured to temporarily store the at least one of the audio or video data in transit between the wireless network and the wireless communication device.

3. The communication device cradle of claim 1, further comprising a recharge module configured to recharge a battery of the wireless communication device via the cradle portion when the wireless communication device is electrically coupled with the communication device cradle.

4. A method of providing a dual function charging cradle comprising:
a cradle aligning a beacon signal with the mesh wireless network by receiving and analyzing beacon signals from neighboring nodes and developing a neighbor list that describes a topology of the mesh wireless network,
the cradle wirelessly receiving at least one of audio or video data from the mesh wireless network; and
the cradle wirelessly transmitting the at least one of audio or video data to the mesh wireless communication device.

5. The method of claim 4, further comprising the cradle storing the at least one of the audio or video data in transit between the mesh wireless network and the mesh wireless communication device.

6. The method of claim 4, further comprising the cradle charging a battery of the mesh wireless communication device when the mesh wireless communication device is electrically coupled with the cradle.

7. An article of manufacture including a non-transitory computer readable medium having instructions stored thereon that, in response to execution by a computing device, cause the computing device to perform operations comprising:
aligning, at a cradle, a beacon signal with a mesh wireless network by receiving and analyzing beacon signals from neighboring nodes and developing a neighbor list that describes a topology of the mesh wireless network;
wirelessly receiving at least one of audio or video data at the cradle from the mesh wireless network; and
wirelessly transmitting the at least one of audio or video data from the cradle to the mesh wireless communication device.

8. The article of manufacture of claim 7, wherein the operations further comprise storing, at the cradle, the at least one of the audio or video data in transit between the mesh wireless network and the mesh wireless communication device.

9. The article of manufacture of claim 7, wherein, the operations further comprise charging a battery of the mesh wireless communication device when the mesh wireless communication device is electrically coupled with the cradle.

* * * * *